Figure 1:
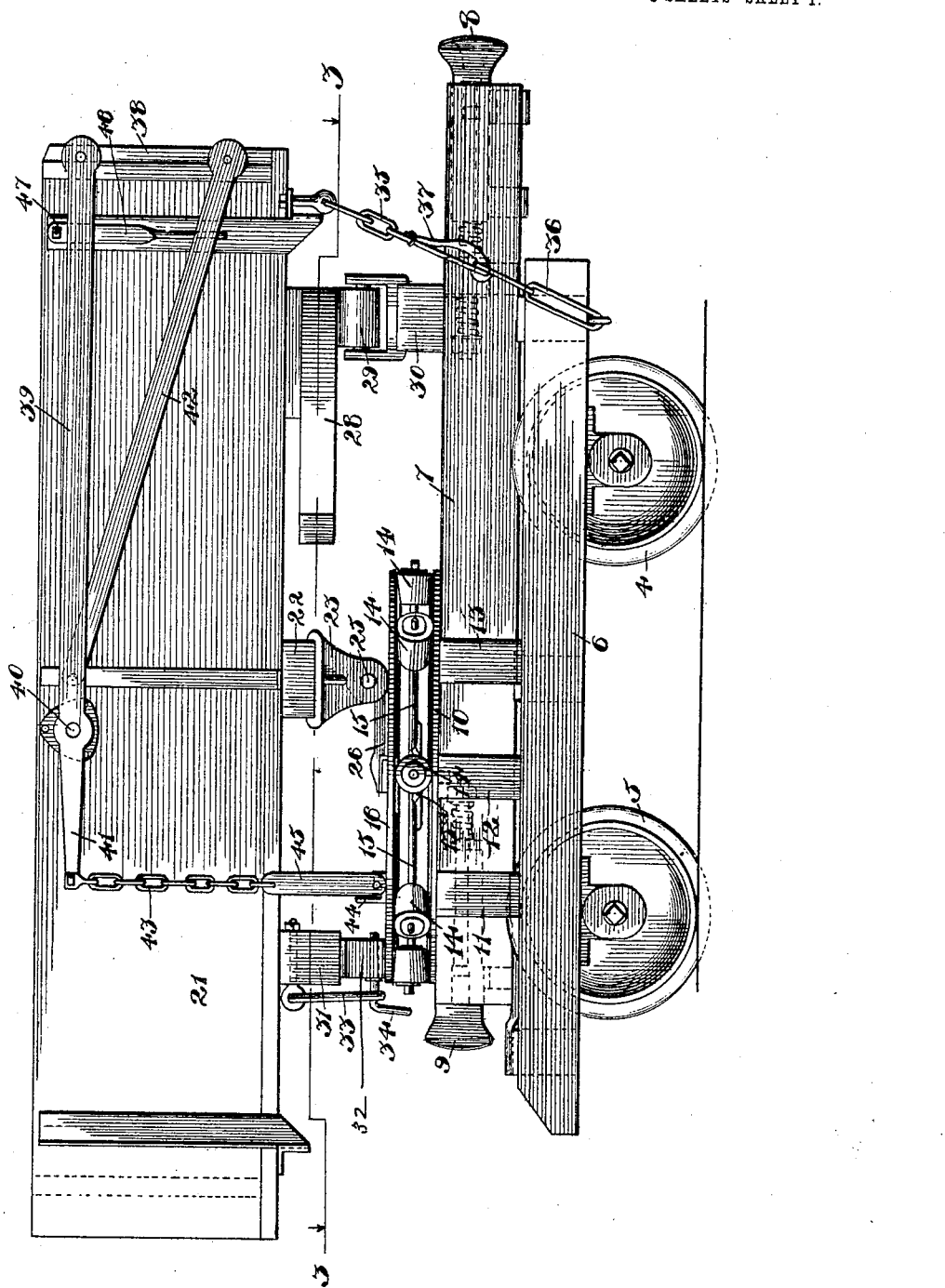

No. 809,522. PATENTED JAN. 9, 1906.
T. R. McKNIGHT.
DUMP CAR.
APPLICATION FILED JULY 11, 1903.

3 SHEETS—SHEET 1.

Witnesses:
J. B. Weir
G. V. Hornans.

Inventor
Thomas R. McKnight
by Bond Adams Pickard Jackson
his Attys.

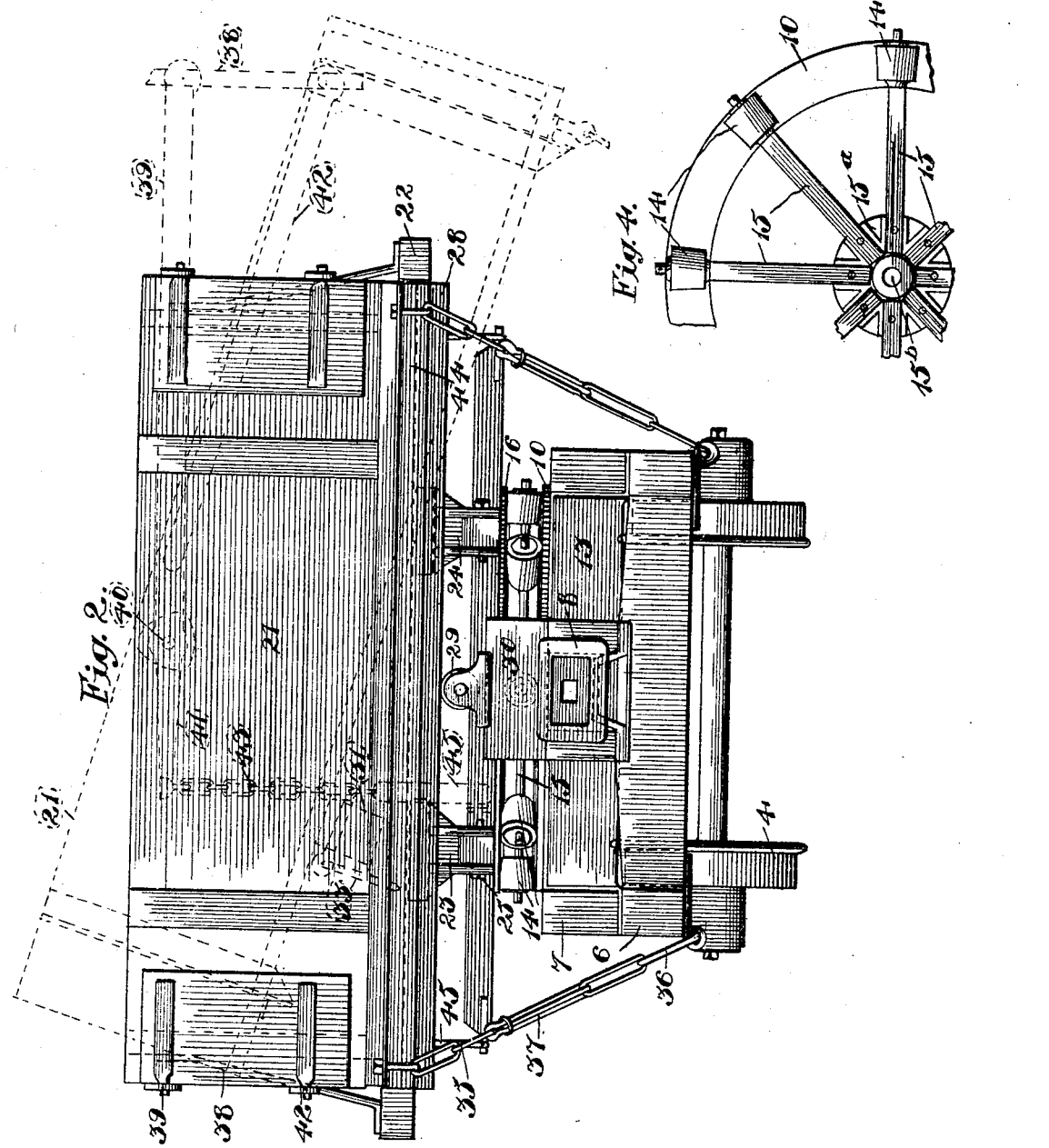

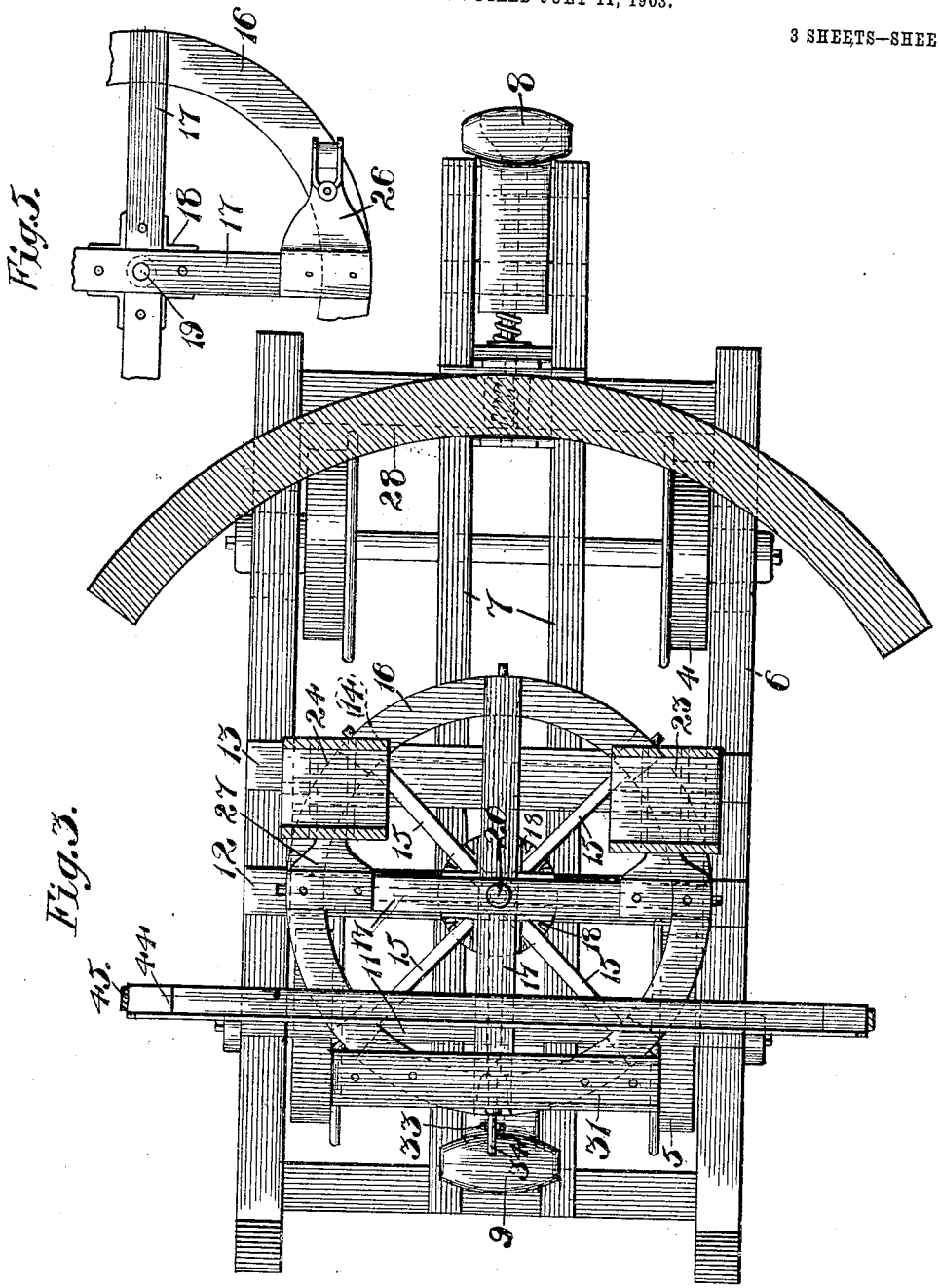

UNITED STATES PATENT OFFICE.

THOMAS R. McKNIGHT, OF AURORA, ILLINOIS, ASSIGNOR TO WESTERN WHEELED SCRAPER COMPANY, OF AURORA, ILLINOIS, A CORPORATION OF ILLINOIS.

DUMP-CAR.

No. 809,522.  Specification of Letters Patent.  Patented Jan. 9, 1906.

Application filed July 11, 1903. Serial No. 165,118.

*To all whom it may concern:*

Be it known that I, THOMAS R. McKNIGHT, a citizen of the United States, residing at Aurora, in the county of Kane and State of Illinois, have invented certain new and useful Improvements in Dump-Cars, of which the following is a specification, reference being had to the accompanying drawings.

My invention relates to dump-cars, and has for its object to provide improved end-gate mechanism by which the end gate may be held up out of operative position to facilitate loading the car-body at the end by hand, in improved means for automatically operating the end gate to expose the open end of the car-body when it is dumped, and in an improved arrangement of the end-gate-operating mechanism by which the car-body may be rotated without affecting such operating mechanism which rotates with the car-body.

I accomplish my object as illustrated in the drawings and as hereinafter described.

What I regard as new is set forth in the claims.

In the accompanying drawings, Figure 1 is a side view of my improved car. Fig. 2 is an end view thereof. Fig. 3 is a horizontal section on line 3 3 of Fig. 1. Fig. 4 is a detail illustrating the construction of the roller-supports; and Fig. 5 is a detail, being a partial plan view of the upper member of the turn-table.

Referring to the drawings, 4 5 indicate the wheels of the truck. For convenience in description the wheels 4 will be termed the "front" wheels and the wheels 5 the "rear" wheels. It will be understood, however, that such terms are purely relative. The body of the truck is composed of a platform 6, mounted upon the wheels 4 5, and beams 7, which are mounted centrally upon the platform 6 and extend longitudinally thereof, as best shown in Figs. 1 and 3. The forward ends of the beams 7 extend a considerable distance beyond the front end of the platform 6, while the rear end of the platform 6 extends a short distance beyond the rear ends of the beams 7, as best shown in Fig. 1.

8 9 indicate coupler-heads secured to the front and rear ends of the beams 7, as shown in Fig. 1, thus providing for coupling the truck to other trucks at either or both ends. By this construction the cars can be coupled into trains, so that they can be pushed without injury to the bed or box as well as drawn in train.

10 indicates an annular beveled track carried by the truck and forming the lower member of a turn-table upon which the car-body rests. The track 10 rests upon the upper surfaces of the beams 7 and upon transverse supports 11 12 13. (Best shown in Figs. 1 and 3.)

14 indicates a series of conical rollers adapted to run upon the track 10, said rollers being mounted on the outer ends of bars 15, radiating from the central hub $15^a$, as best shown in Fig. 4. The hub $15^a$ is concentric with the track 10, and it is provided with a central passage $15^b$, which registers with a passage in the transverse supports 12, as indicated by dotted lines in Fig. 1.

16 indicates an upper beveled annular track similar to the track 10, the track 16 being inverted upon the rollers 14, as shown in Fig. 1. As best shown in Fig. 5, the upper track 16 is provided with radial ribs or spokes 17, connected at the center by a casting 18. (Best shown in Fig. 1.) The casting 18 lies over the hub $15^a$ and is provided with a central passage 17, which registers with the passage $15^b$. A coupling-pin 20 serves to connect the casting 18 with the hub $15^a$ and also with the truck as it passes through the passages 19 $15^b$, and the passage in the transverse support 12 forming a pivot, about which the upper track 16 and the bars 15, with their rollers 14, rotate.

It will be observed by an inspection of Figs. 1 and 3 that the center of the turn-table is not coincident with the center of the wheel-base of the truck, but that the turn-table extends partly over the wheels 5, being nearer the rear end of the platform 6. The object of this construction will be hereinafter described.

21 indicates the car-body, which is supported upon the truck and is arranged to rock thereupon. As best shown in Fig. 1, a transverse beam 22 is provided, which is arranged centrally of the car-body and extends thereunder from one side to the other. Said beam rests upon rockers 23 24, pivotally connected by pivots 25 with arms 26 27, respectively, which are fixedly secured to the upper track 16 of the turn-table and extend forward far enough so that the pivots 25 are over the longitudinal center of the wheel-base when the parts are in the position shown in Fig. 1, which may be termed their "normal" position. At this time the car-body is parallel with the truck, and the longitudinal center of the car-body is substantially coincident with the center of the wheel-base. Obviously, however, by rotating the upper track 16, and with it the car-body, the longitudinal center of the car-body may be brought to lie over the wheels 5, causing the greater part of the car-body to project beyond the rear end of the truck, thus enabling the load to be dumped beyond the rear end of the truck. Furthermore, by turning the car-body at right angles to the truck the rockers 23 may be moved nearer the side of the truck for convenience in dumping at the sides, as best shown by dotted lines in Fig. 2.

In order to support and guide it, the car-body is provided on its side with a curved beam or rail 28, (best shown in Figs. 1 and 3,) which when the car-body approaches its normal position is adapted to rest upon a stationary roller 29, supported by a standard 30, secured near the front end of the truck. (Best shown in Fig. 1.) Preferably the rail 28 extends through an arc of about ninety degrees, so that during a considerable part of the rotary movement of the car-body it is supported by the roller 29. Near its rear end the car-body is provided on its under side with a block 31, adapted to rest on a block 32, secured upon the upper surface of the track 16, as shown in Fig. 1. A link 33, secured to the block 31, and a rotary hook 34, serve as a means of detachably securing the two blocks 31 32 together. When the parts are so secured together, the tilting or rocking of the car-body upon the rockers 23 24 is prevented. The car-body is further secured in its normal position and prevented from rotating on the turn-table by side chains 35 36, a pair of said chains being provided at each side of the car, near the front end thereof, as shown in Figs. 1 and 2. The chains 35 are secured to the car-body, while the chains 36 are secured to the truck. Hooks 37 are provided for detachably connecting the chains of each pair together.

38 indicates the end gate of the car-body, which, as shown in Fig. 1, is connected at its ends to operating-levers 39, one of said levers being provided at each side of the car-body. The levers 39 are mounted on pivots 40, placed between their ends, as shown in Fig. 1, so that said levers may be operated by means of their projecting rear ends 41.

42 indicates braces which connect the lower end portions of the end gate 38 with the levers 39.

43 indicates chains or other flexible connections by which the projecting ends 41 of the levers 39 are connected to a cross-bar 44, secured upon the upper track 16 and normally extending transversely of the truck, as shown in Fig. 3. Preferably links 45 are provided between the chains 43 and the cross-bar 44; but said links may be omitted, if desired, chains 43 or other flexible connections being employed alone.

46 indicates pivoted bars, one of which is preferably provided at each side of the car-body, near the front end thereof. Said bars 46 are mounted upon pivots 47 in such manner that they are adapted to be turned up, so as to project above the upper side edges of the car-body in position to engage the end gate or the levers 42 to hold the end gate in an elevated position, and thereby expose the end of the car. By this means I facilitate the loading of the car by hand, since by reason of the end gate, as above described, the dirt being loaded does not have to be thrown over the end gate, but is thrown directly into the open end of the car-body.

In operation the car is loaded either with the parts in the position shown in Fig. 1—as, for example, when the dirt to be loaded is at a greater elevation than the car-body, or the car-body is turned at right angles to the position shown in Fig. 1 and the end gate raised to expose the open end of the car-body, as is desirable when the dirt to be loaded has to be lifted. By using the flexible connections 43 the elevation of the end gate independently of the car is made possible. When the car is loaded, it is transported to the dumping-ground, and may then be dumped either at the side or at the rear end. For dumping at the side the chains 35 36 are disconnected and the car-body is swung through an arc of about ninety degrees, carrying the rockers 23 toward one side or the other of the truck. It will be noted that during transportation the rockers lie over the center of the wheel-base, so that the load is properly supported upon the truck. When the load is to be dumped, the link 33 is disconnected from the hook 34 by partially rotating the hook and the car-body is tilted, as indicated by dotted lines in Fig. 2. When the car-body is tilted, the end gate is held in its upper or normal position by the chains 43, acting through the levers 39, while the front end of the car-body descends, thereby permitting the contents of the car-body to be discharged. When the car-body is restored to its horizontal position, it again meets the end gate.

By securing the cross-bar 44, to which the chains 43 are connected, to the track 16 it rotates with the car-body, and consequently the automatic mechanism by which the end gate is held up when the load is dumped is always ready to operate, regardless of the position into which the car-body is swung on the truck. This is an important feature of my invention.

The operation of dumping at the rear is substantially the same as that described, the car-body being permitted to tilt freely by reason of the fact that the rockers 23 then lie over the rear portion of the track.

While I have described in detail the embodiment of my invention illustrated in the accompanying drawings, I wish it to be understood that my invention is generic as regards the features set forth in the broader claims and is not restricted to the details of the construction shown and described, except in so far as they are particularly claimed, since, as is apparent, many modifications may readily be made without departing from my invention.

So far as the end gate is concerned, it is evident that my improvements may be applied to side gates as well, the term "end gate" being used in a generic sense to indicate a side gate as well as one at the end of the car.

What I claim as my invention, and desire to secure by Letters Patent, is—

1. A dump-car, consisting of a wheeled truck, a tilting car-body having an open end, an edgewise-movable gate therefor, a rotary support on which said car-body rests, and means rotating with the car-body for automatically holding up the end gate when the car-body is tilted to dump the load.

2. A dump-car, consisting of a wheeled truck, a car-body having an open end, an end gate therefor pivotally connected with the car-body, and means for securing said end gate out of operative position to expose the open end of the car-body when the car-body is in its normal position, substantially as described.

3. A dump-car, consisting of a wheeled truck, a car-body having an open end, an end gate therefor, a pivoted lever connecting said end gate with the car-body, and means for securing said end gate up out of operative position when the car-body is in its normal position to expose the open end of the car-body, substantially as described.

4. A dump-car, consisting of a wheeled truck, a tilting car-body open at one end, an edgewise-movable end gate therefor, means pivotally supporting said car-body so that it may be rotated upon the truck, and means rotating with the car-body for holding up the end gate out of operative position when the car-body is tilted to dump the load, substantially as described.

5. A dump-car, consisting of a wheeled truck, a tilting car-body open at one end, an edgewise-movable end gate therefor, means pivotally supporting the car-body so that it may be rotated upon the truck, and means rotating with the car-body for holding up the end gate out of operative position when the car-body is tilted to dump the load, substantially as described.

6. A dump-car, consisting of a wheeled truck, a tilting car-body having an open end, an edgewise-movable end gate therefor, a rotary support on which said car-body rests, and means connected with said support for holding up the end gate out of operative position when the car-body is tilted to dump the load, substantially as described.

7. A dump-car, consisting of a wheeled truck, a tilting car-body having an open end, an edgewise-movable end gate therefor, a turn-table on which said car-body is mounted, and means connected with the upper portion of said turn-table for holding up the end gate out of operative position when the car-body is tilted to dump the load, substantially as described.

8. A dump-car, consisting of a wheeled truck, a car-body having an open end, an edgewise-movable end gate therefor, a turn-table on which said car-body rests, a lever for operating said end gate, and means connecting said lever with the rotary portion of said turn-table and arranged to operate said lever to hold the end gate out of operative position when the car-body is tilted, substantially as described.

THOMAS R. McKNIGHT.

Witnesses:
R. G. SCOTT,
J. S. GILMAN.